United States Patent
Hauptmann et al.

(10) Patent No.: US 6,471,581 B1
(45) Date of Patent: Oct. 29, 2002

(54) METHOD AND APPARATUS FOR VENTILATING AT LEAST ONE WINDOW IN A VEHICLE

(75) Inventors: Werner Hauptmann, Höhenkirchen (DE); Tilmann Seubert, Bad Abbach (DE); Volkmar Sterzing, Neubiberg (DE); Willfried Wienholt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/677,838

(22) Filed: Oct. 2, 2000

(30) Foreign Application Priority Data

Sep. 30, 1999 (DE) .......................... 199 47 038

(51) Int. Cl.$^7$ ................................. B60S 1/54
(52) U.S. Cl. ...................... 454/75; 454/121; 454/124
(58) Field of Search .................. 454/75, 121, 122, 454/124, 127, 156

(56) References Cited

U.S. PATENT DOCUMENTS

| | | | | |
|---|---|---|---|---|
| 3,715,966 A | * | 2/1973 | Mietinen | 454/124 |
| 4,807,523 A | * | 2/1989 | Radtke et al. | 244/1 R |
| 4,848,444 A | * | 7/1989 | Heinle et al. | |
| 4,910,967 A | * | 3/1990 | Takahashi | |
| 5,971,287 A | * | 10/1999 | Kettner et al. | 454/75 |

FOREIGN PATENT DOCUMENTS

| | | |
|---|---|---|
| DE | 3836559 A1 | 5/1990 |
| DE | 4307641 A1 | 9/1994 |
| JP | 5-193455 A * | 8/1993 |

* cited by examiner

*Primary Examiner*—Harold Joyce
(74) *Attorney, Agent, or Firm*—Herbert L. Lerner; Laurence A. Greenberg; Werner H. Stemer

(57) ABSTRACT

A method and an apparatus for ventilating at least one window in a vehicle by blowing and extracting air in a region of the window is described. The airflow blown against the window is substantially laminar and the air is extracted in an upper region of the window. A dew point is lower than the window temperature in a region of extraction being the upper region of the window, and an absolute humidity of the blown air is lower than that of the extracted air.

6 Claims, 1 Drawing Sheet

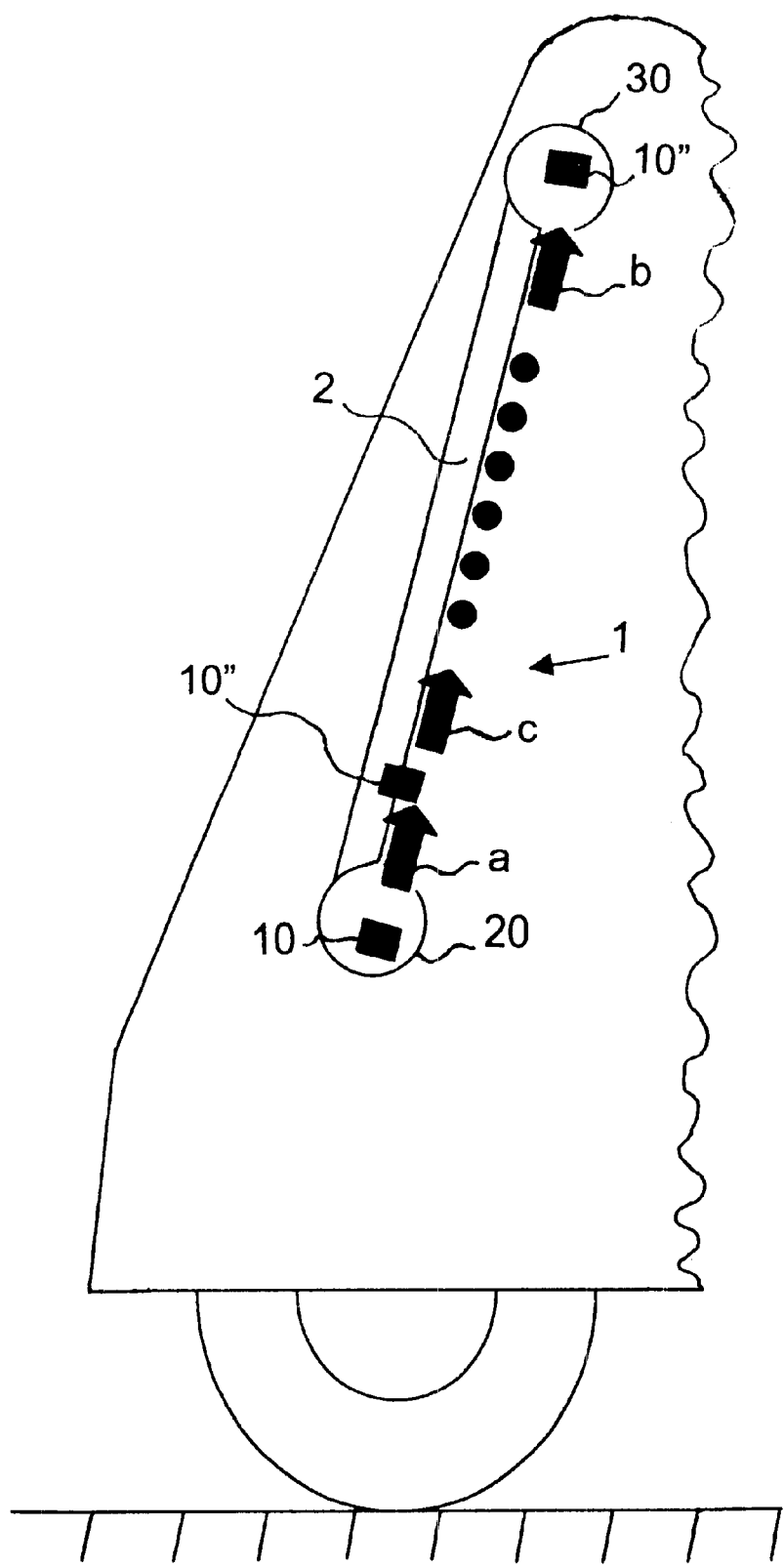

METHOD AND APPARATUS FOR VENTILATING AT LEAST ONE WINDOW IN A VEHICLE

BACKGROUND OF THE INVENTION

Field of the Invention

The invention relates to a method of achieving a state at a surface of an object and to an apparatus for performing the method, in particular for ventilating at least one window in a vehicle.

The generally known state of the art is that the ventilation of the windows in a vehicle takes place from a source. Thus heated air, with correspondingly lower relative atmospheric humidity, is blown against the windows. In addition, when an air conditioning unit is in use, moisture is withdrawn at the evaporator during the cooling process.

After passing the evaporator, the cooled air has a lower absolute atmospheric humidity. When warmed at the window, therefore, it is able to absorb moisture.

A serious disadvantage lies in the fact that the atmospheric humidity withdrawn by the evaporator is deposited there. If the air conditioning unit is now switched off, the moisture stored in the evaporator passes back into the passenger compartment and is deposited on the windows.

The air conditioning unit, once it has been switched on, must run continuously in order for the evaporator to be constantly cooled and not release its moisture again. The lastingly low atmospheric humidity caused thereby is perceived by the vehicle passengers as unpleasant and should therefore be avoided.

SUMMARY OF THE INVENTION

It is accordingly an object of the invention to provide a method and an apparatus for ventilating at least one window in a vehicle which overcome the above-mentioned disadvantages of the prior art methods and devices of this general type, in which, using neuroinformatics methods, a medium acting on the object meets conditions which are perceived as optimal, in particular by passengers of a vehicle. In particular, satisfactory and functionally reliable ventilation of at least one window in a motor vehicle is achieved.

With the foregoing and other objects in view there is provided, in accordance with the invention, a method of achieving a given state on an object. The method includes the step of providing a medium acting on a surface of the object. The medium has an influential parameter being below that of the object in a particular region of the object, and an entry state of the medium is lower than that of an exit state of the medium.

The object is achieved, according to the invention, in that a medium acting on the object must meet the below listed conditions. One influential parameter of the medium must be below that of the object in a particular region of the object, and the entry state of the medium is lower than that of the exit state. The influential parameter of the medium here may be the air temperature and the entry state is an absolute atmospheric humidity.

In the method and the apparatus for ventilating the window, according to the invention, the air flow blown against the window is substantially laminar and the air is extracted in the upper region of the window. The dew point is lower than the window temperature in the region of extraction being the upper zone of the window, and the absolute humidity of the blown air is lower than that of the extracted air.

In this way, misting, fogging, or icing of the windows in the interior of the vehicle is avoided in a simple manner without reducing traveler comfort or adversely affecting the conditions of temperature and/or climate for the vehicle passengers.

In accordance with an added feature of invention, the influential parameter of the medium is air temperature and the entry state is an absolute atmospheric humidity.

With the foregoing and other objects in view there is further provided, in accordance with the invention, a method of ventilating at least one window of a vehicle. The method includes the steps of blowing a substantially laminar flow of air in a region of the window; and extracting the air from a region of extraction of the window being an upper zone of the window. A dew point in the region of extraction is lower than a window temperature in the region of extraction, and an absolute humidity of the air blown against the window is lower than that of extracted air.

In accordance with an added feature of the invention, there is the step of controlling a temperature, a humidity and a velocity of the air.

In accordance with an additional feature of the invention, there is the step of using a neuroinformatics method for performing the controlling step.

In accordance with another feature of the invention, there is the step of determining a relative atmospheric humidity, a temperature of the extracted air, the window temperature, and a relative humidity and a temperature of the air blown along the window.

In accordance with a further feature of the invention, the vehicle is a motor vehicle.

With the foregoing and other objects in view there is additionally provided, in accordance with the invention, an apparatus for controlling a ventilation of at least one window of a vehicle. The apparatus is formed of an air blowing device feeding air along a region of the window; an air extracting device for extracting the air from an upper zone of the window; and sensor elements connected to the air blowing device and disposed in a region of the window for controlling a temperature, a humidity and a velocity of the air.

In accordance with a concomitant feature of the invention, the sensor elements are disposed to and determine a relative atmospheric humidity, a temperature of extracted air, a window temperature, and the humidity and a temperature of the air used to ventilate the window.

Other features which are considered as characteristic for the invention are set forth in the appended claims.

Although the invention is illustrated and described herein as embodied in a method and an apparatus for ventilating at least one window in a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a diagrammatic, fragmented view of a vehicle having a window.

DESCRIPTION OF THE PREFERRED EMBODIMENT

Referring now to the single FIGURE of the drawing in detail, there is shown a diagrammatically illustrated vehicle 1, especially a motor vehicle, having a plurality of windows 2, only one window being shown in the example of the embodiment. The window 2 is subjected to a substantially laminar upward flow of air a, so that an air flow c is produced by an air blowing device 20. Air is extracted in an upper zone of the window 2 by an air extraction device 30 resulting in extracted air b. The air blowing device 20 and the air extraction device 30 may be an integrated unit. In this configuration, a dew point lies below a window temperature in a region of extraction in the upper zone of the window 2.

An absolute humidity of the blown air a is, furthermore, below that of the extracted air b. Via sensor elements 10, 10' and 10", a relative atmospheric humidity, a temperature of the extracted air and that of the window 2, and the relative humidity and temperature of the air used to ventilate the window 2 are determined. With the aid of the sensor elements 10, 10', 10", the temperature, humidity and velocity of the air are controlled and/or regulated.

The fact that the dew point is lower than the window temperature ensures that no misting can arise on the window 2. Since an absolute humidity of the blown air a is lower than the absolute humidity of the extracted air b, any misting can be removed from the window 2.

Misting or icing of the windows 2 in the interior of the vehicle is avoided in a simple manner by the apparatus and method according to the invention.

The invention is applicable to passenger motor vehicles, commercial motor vehicles and public transport and ensures high functional reliability by avoidance of the disadvantages mentioned initially.

We claim:

1. A method of ventilating at least one window of a vehicle, which comprises the steps of:

blowing a substantially laminar flow of air in a region of the window;

extracting the air from a region of extraction of the window being an upper zone of the window, a dew point in the region of extraction being lower than a window temperature in the region of extraction, and an absolute humidity of the air blown against the window being lower than that of the extracted air; and determining a relative atmospheric humidity, a temperature of the extracted air, the window temperature, and a relative humidity and a temperature of the air blown along the window.

2. The method according to claim 1, which comprises controlling a temperature, a humidity and a velocity of the air.

3. The method according to claim 1, wherein the vehicle is a motor vehicle.

4. An apparatus for controlling a ventilation of at least one window of a vehicle, comprising:

an air blowing device feeding air along a region of the window;

an air extracting device for extracting the air from an upper zone of the window; and sensor elements connected to said air blowing device and disposed in a region of the window for controlling a temperature, a humidity and a velocity of the air.

5. The apparatus according to claim 4, wherein said sensor elements are disposed to and determine a relative atmospheric humidity, a temperature of extracted air, a window temperature, and the humidity and a temperature of the air used to ventilate the window.

6. The apparatus according to claim 4, wherein the vehicle is a motor vehicle.

* * * * *